US012771912B2

(12) United States Patent
Seran et al.

(10) Patent No.: US 12,771,912 B2
(45) Date of Patent: Oct. 20, 2026

(54) SYSTEMS AND METHODS FOR AUTOMATED VIDEO HIGHLIGHT GENERATION

(71) Applicant: VERIZON PATENT AND LICENSING INC., Basking Ridge, NJ (US)

(72) Inventors: Vidhya Seran, Irving, TX (US); Adwait Ashish Murudkar, Foster City, CA (US); Sergey Virodov, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/958,562

(22) Filed: Nov. 25, 2024

(65) Prior Publication Data

US 2026/0149857 A1 May 28, 2026

(51) Int. Cl.
*H04N 21/8549* (2011.01)
*G06V 20/40* (2022.01)

(52) U.S. Cl.
CPC ......... *H04N 21/8549* (2013.01); *G06V 20/41* (2022.01)

(58) Field of Classification Search
CPC ........................... H04N 21/8549; G06V 20/41
See application file for complete search history.

(56) References Cited

U.S. PATENT DOCUMENTS

2024/0371164 A1* 11/2024 Yan ........................ G06V 10/82
2025/0097385 A1* 3/2025 Lee ........................ H04N 7/155

* cited by examiner

*Primary Examiner* — Girumsew Wendmagegn

(57) ABSTRACT

Disclosed are systems and methods that provide a computerized framework for automatically and/or dynamically generating video highlights via implementations of LLMs. In some implementations, the framework can leverage LLMs and contextual embeddings to automatically generate video highlights by identifying key moments, insights and/or salient points, determining a similarity among segments within the video, then compiling a concise highlights reel that can be curated and/or modified to a requesting and/or viewing user. Such automated highlight generation can save time, identify relevant content and deliver a customized video experience for each viewer.

20 Claims, 5 Drawing Sheets

SYSTEMS AND METHODS FOR AUTOMATED VIDEO HIGHLIGHT GENERATION

BACKGROUND INFORMATION

Highlight videos are commonly used in sports and other outlets to show a replay of some salient event or action. Such videos depict portions of previously recorded media and/or live events, whether downloaded, streamed and/or rendered in real-time.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
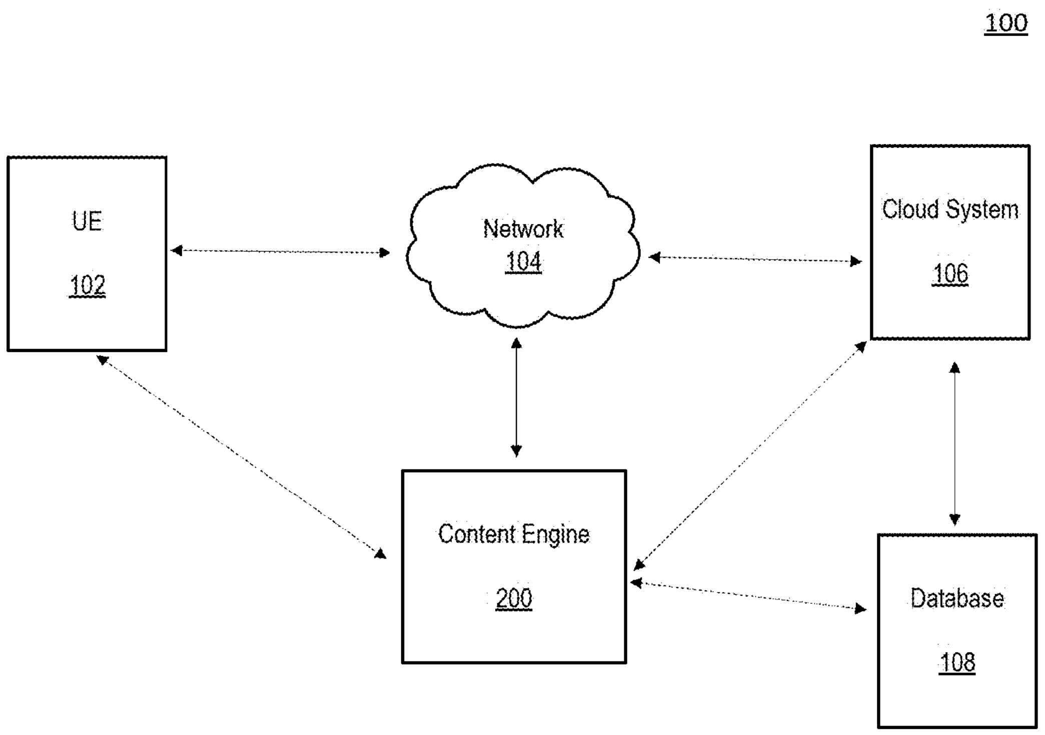
FIG. 1 is a block diagram of an example network architecture according to some embodiments of the present disclosure.

Conventional mechanisms for creating video highlights or replays involve manual processes, which require an operator to select or mark instances in the video that need to be replayed, either for live viewing or pre-recorded media. To that end, as provided herein, according to some embodiments, among other technical features, the disclosed systems and methods provide a computerized framework for automatically and/or dynamically generating such highlights via novel implementations of large language models (LLMs), which can include large contextual video models and cross-similarly metrics for tracking specific criteria depicted within a video (e.g., player, uniform, team, play, ball, article, and the like, or some combination thereof) to curate such highlights that are accurate and efficiently produced.

As discussed herein, the rise of visual media, particularly in the sports and entertainment industries, has led to an increasing demand for efficient and effective video highlight generation. These highlights serve as captivating recaps of the most salient events, allowing viewers to revisit and enjoy the fast-paced action in a more easily digestible format. However, the traditional manual methods of generating these highlights are labor-intensive, expensive and often unable to keep up with the rapid pace of modern visual media consumption.

To address these challenges, among other technical shortcomings, the instant disclosure provides a computerized framework for automated video highlight generation using LLMs and, in some embodiments, transformer-based video processing techniques. As discussed herein, according to some embodiments, the disclosed framework can leverage the power of contextual video embeddings to detect and classify salient events within video footage, thereby enabling the automatic creation of labeled video highlights without the need for manual intervention.

Video highlights play a crucial role in various domains, particularly in the sports industry. They provide instant replays of key moments, such as goals, collisions, fouls, and the like, thereby allowing viewers to revisit and analyze these events in slow motion, for example. Beyond sports, video highlights can be used for movies to capture specific scenes and/or dialog, which can drive movie marketing, for example.

Thus, as discussed herein, the disclosed systems and methods provide functionality for automating the processing for both live (e.g., while the event is still in progress) and/or offline replays/highlights by leveraging the information encoded in video embeddings to detect and/or classify salient scenes and their content, thereby enabling an algorithmic approach to automatically generating labeled replay/highlight reels. According to some embodiments, as discussed herein, the framework can perform such automated video highlight generation by identifying and comparing embeddings of different video segments using a metric, such as, for example, cosine similarity, whereby the framework can identify parts of the video that are distinct or salient, and automatically generate labeled replay or highlight reels based therefrom.

As discussed herein, the disclosed framework can operate to leverage the power of contextual video embeddings to detect and classify salient events, such that labeled replay and/or highlight videos (or reels) can be automatically generated, thereby providing a cost-effective, scalable and accessible framework that can be implemented at home, at an event, on the network, at a server, on a user's device (e.g., smart phone, television, for example) and the like, so that highlights can be created upon request and/or dynamically as content is captured and/or rendered.

Accordingly, as discussed herein, in both live and pre-recorded cases, the operation and/or performance of the disclosed framework's functionality does not require manual intervention or human-in-loop (HIL) involvement to generate highlights or replays. This alleviates the dependence on expensive equipment and opportunities for human error. Further, in some embodiments, the framework can operate a base and/or multi-modal model, and/or categorical-based classifier, to automatically tag video segments (e.g., set of frames of a video, as discussed infra), content and/or digital information depicted within such segments with appropriate labels, which can be tied to specific events, plays, and/or players, which can be utilized for video highlight curation, generation and/or dissemination over a network and/or to users, as discussed below in more detail.

With reference to FIG. 1, system 100 is depicted which includes user equipment (UE) 102, network 104, cloud system 106, database 108, and content engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1.

According to some embodiments, UE 102 can be any type of end-device operated in a mobile wireless network. For example, UE 102 can include, but not be limited to, a mobile phone, tablet, laptop, Internet of Things (IOT) device, wearable device, an autonomous guided vehicle (AGV), autonomous mobile robot (AMR), unmanned aerial vehicle (UAV), and/or any other type of device.

In some embodiments, network 104 can be any type of network, and can facilitate connectivity of the components of system 100, as illustrated in FIG. 1. Further discussion of embodiments of network 104 are provided below with reference to FIG. 4.

According to some embodiments, cloud system 106 may be any type of cloud operating platform and/or network-based system upon which applications, operations, and/or other forms of network resources may be located. For example, cloud system 106 may be a service provider and/or network provider from where services and/or applications may be accessed, sourced or executed from. For example, system 106 can represent the cloud-based infrastructure associated with a Mobile Network Operator (MNO) or the tenant of a dedicated network (e.g., network 104), and communicates with associated network resources hosted in a private or neutral host network (e.g., network 104).

In some embodiments, cloud system 106 may include a server(s) and/or a database of information. In some embodiments, a database 108 of cloud system 106 may store a set of data and/or metadata associated with network information related to the components and/or the users (e.g., UEs 102) of system 100. In addition, database 108 may store information (e.g., video content, embeddings, similarity metrics, LLMs, and the like) used by a content engine 200, which corresponds to the novel functionality described herein.

In some embodiments, cloud system 106 can provide a private/proprietary management platform for network 104 and other devices/platforms operating thereon, and further host and/or communicate with content engine 200.

According to some embodiments, database 108 may correspond to a data storage for a platform (e.g., a network hosted platform, such as cloud system 106) or a plurality of platforms. Database 108 may receive storage instructions/requests from, for example, content engine 200 (and associated microservices), which may be in any type of known or to be known format, such as, for example, standard query language (SQL). Database 108 may correspond to any type of known or to be known storage, for example, a memory or memory stack of a device, a distributed ledger of a distributed network (e.g., blockchain, for example), a look-up table (LUT), and/or any other type of secure data repository.

Content engine 200, as discussed above and further below in more detail, can include components for the disclosed functionality. According to some embodiments, content engine 200 may be a special-purpose machine or processor within cloud system 106, or hosted by a device (or component) on network 104. In some embodiments, content engine 200 may be hosted by a server and/or set of servers associated with cloud system 106.

According to some embodiments, content engine 200 may be configured to implement and/or control a plurality of services and/or microservices, where each of the plurality of services/microservices are configured to execute a plurality of workflows associated with performing the disclosed estimation of backhaul bandwidth and private core capacity. Non-limiting embodiments of such workflows are provided below.

According to some embodiments, content engine 200 may function as an application provided by and/or hosted by cloud system 106. In some embodiments, content engine 200 can be embodied as an application executing on UE 102 (e.g., downloaded and/or web-based execution, for example). In some embodiments, content engine 200 may function as an application installed on a server(s), network location and/or other type of network resource associated with cloud system 106 and/or network 104. In some embodiments, content engine 200 may be configured and/or installed as an augmenting script, program or application (e.g., a plug-in or extension) to another application or program provided by cloud system 106 and/or network 104 that is executed over network 104 and/or on UE 102.

Figure 2:
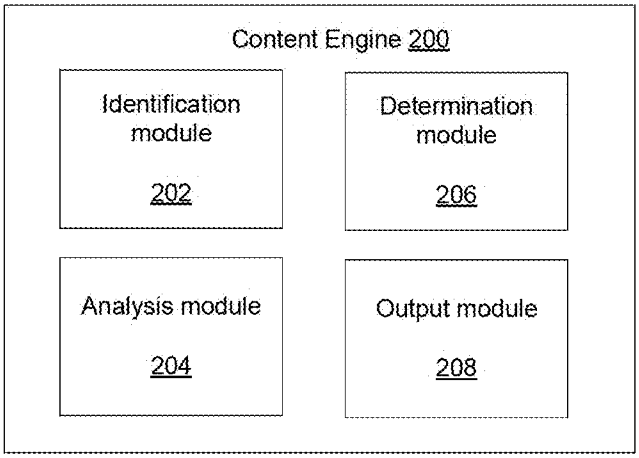
FIG. 2 is a block diagram illustrating components of an exemplary system according to some embodiments of the present disclosure.

As illustrated in FIG. 2, according to some embodiments, content engine 200 includes identification module 202, analysis module 204, determination module 206 and output module 208. It should be understood that the modules discussed herein are non-exhaustive, as additional or fewer modules (or sub-modules) may be applicable to the embodiments of the systems and methods discussed. More detail of the operations, configurations and functionalities of content engine 200 and each of its modules, and their role within embodiments of the present disclosure will be discussed below.

Figure 3:
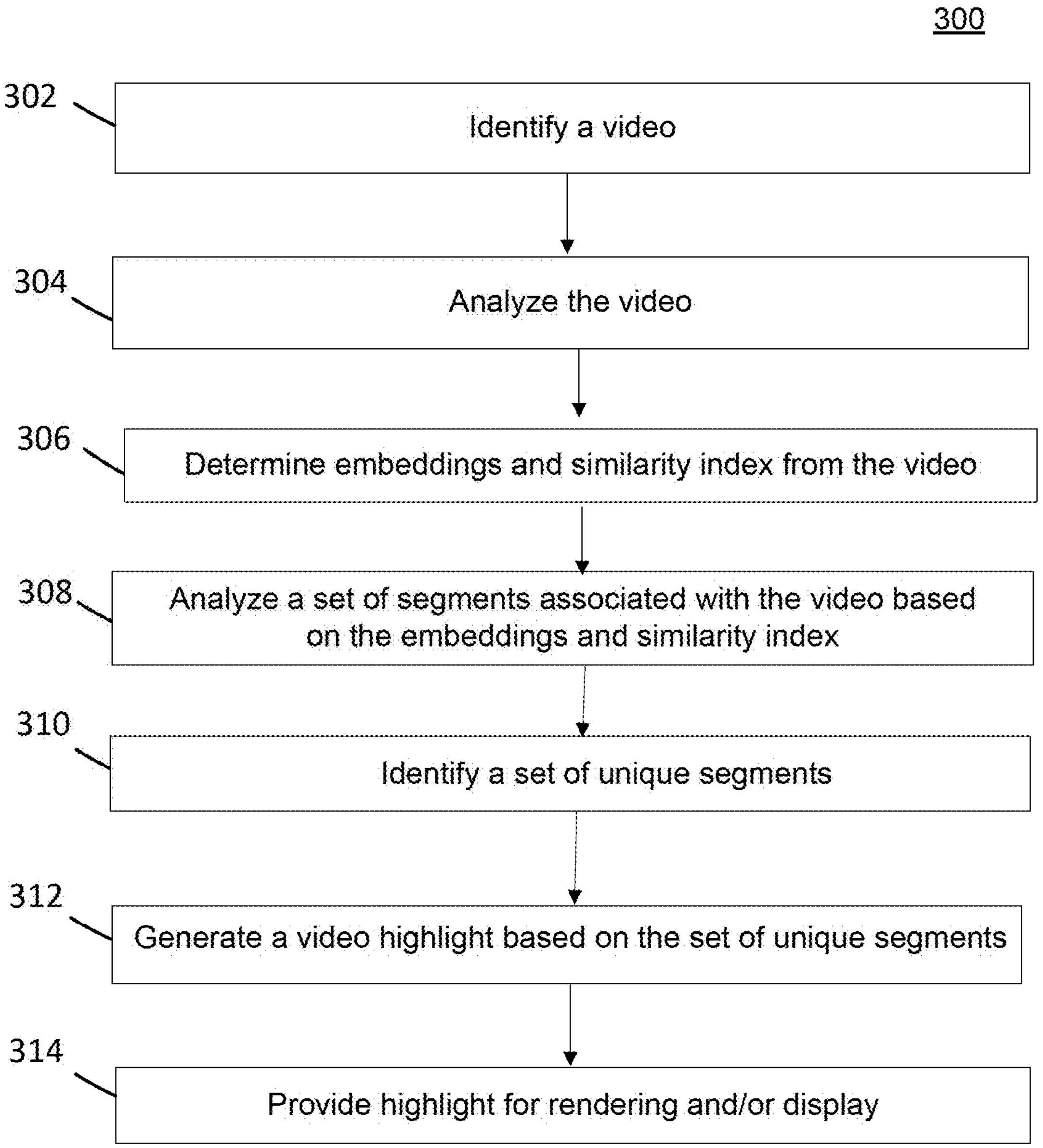
FIG. 3 illustrates an exemplary workflow according to some embodiments of the present disclosure.

In FIG. 3, Process 300 provides non-limiting example embodiments for an innovative approach to automated video highlight generation, which leverages the power of computer models, inclusive of, but not limited to, transformer-based models and large language models. As discussed herein, by harnessing the rich contextual information encoded in video embeddings, the disclosed framework can accurately detect and classify salient events within video footage, enabling the automatic creation of labeled video highlights without the need for manual intervention. This addresses the challenges of cost, scalability and accessibility inherent in traditional manual methods, thereby unlocking new opportunities for more engaging, personalized and data-driven video experiences.

According to some embodiments, Step 302 of Process 300 can be performed by identification module 202 of content engine 200; Steps 304 and 308 can be performed by analysis module 204; Steps 306 and 310 can be performed by determination module 206; and Steps 312 and 314 can be performed by output module 208.

According to some embodiments, Process 300 begins with Step 302 where engine 200 can identify a video. According to some embodiments, such video can be sourced from a live stream, pre-recorded, downloaded, locally accessed, and the like.

By way of example, according to some embodiments, in the case of a live stream, engine 200 can ingest and process the video feed in real-time, ensuring that the highlights can be generated and delivered to viewers with minimal latency. In another example, in some embodiments, for pre-recorded videos, engine 200 can deploy operations, which can be offline, local and/or web-based, in some embodiments, to allow for more computationally intensive techniques to be employed, as there is no strict time constraint. However, as discussed herein, engine 200 can process such videos regardless of the source, type, format, resolution, codec, and the like, as engine 200 can operate with compatibility with a diverse range of video content known or to be known in modern media ecosystems.

According to some embodiments, as discussed supra, a video (e.g., a video file or video clip, used interchangeably) can be composed of a sequence of segments, which can be sets of individual frames played in rapid succession. Each video segment represents a snapshot in time, capturing the state of the scene at that instant.

In Step 304, engine 200 can analyze the video. In some embodiments, such analysis can involve parsing the video, and determining, extracting or otherwise identifying data and/or metadata related to, but not limited to, the video, its source, viewing user, device used to render the video, service providing the video, account identifier (ID), content within the video, a time, date, location, and the like, or some combination thereof. As mentioned above, and discussed in more detail below, engine 200 can perform the analysis of the video and/or the video content depicted therein using artificial intelligence and/or machine learning (AI/ML) and/or LLM techniques.

According to some embodiments, engine 200 can perform such analysis via execution of transformer-based models, which are effective in capturing spatial and temporal information presented in video data. For example, such models can include, but are not limited to, Vision Transformer (ViT), TimeSformer, and the like, and/or any other type of known or to be known transformer model that can be employed to generate contextual video embeddings, encoding visual content, motion, semantic relationships within video segments/frames, and the like.

In some embodiments, such analysis in Step 304 can involve engine 200 implementing any type of known or to be known computational analysis technique, algorithm, mechanism or technology to analyze the dataset. For example, in some embodiments, engine 200 may execute and/or include a specific trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may leverage an LLM, whether known or to be known. An LLM is a type of AI system designed to understand and generate human-like text based on the input it receives. The LLM can implement technology that involves deep learning, training data and natural language processing (NLP). Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. This includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the dataset, as discussed herein.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

In Step 306, based on the analysis from Step 304, engine 200 can determine embeddings and a similarity index from the video (and/or video content included/depicted therein). According to some embodiments, such embeddings can correspond to time embeddings and spatial embeddings, which represent temporal and spatial information from video data. Such video embeddings serve as a rich, high-dimensional representation of the video's content, enabling, as provided below, engine 200 to gain a deeper understanding of the video's structure and salient elements for purposes of generating a highlight.

According to some embodiments, time embeddings capture the sequential nature of video frames by encoding the temporal relationships between them. Time embeddings can enable engine 200 to understand the flow and progression of events over time. Such time embeddings can include information related to, but not limited to, timestamp information, frame indices, learned temporal position encodings, and the like, or some combination thereof.

In some embodiments, spatial embeddings encode the spatial relationships between different regions and/or objects within each video frame. Spatial embeddings can be utilized by engine 200 to understand the layout, positioning and/or interactions of visual elements.

As discussed herein, engine 200's determine of such embeddings can enable functionality for a comprehensive understanding of the video data of the video (from Step 302), thereby enabling tasks such as, but not limited to, action recognition, object tracking and video understanding, which can be leveraged for generation of a highlight, as discussed infra.

Accordingly, in some embodiments, the video embeddings (e.g., time and spatial embeddings) can be utilized to compile a similarity index that can be utilized to detect salient video segments. A video can be divided into smaller segments, either based on a fixed time duration and/or through more sophisticated shot-boundary detection algorithms. For each of these segments, the engine 200, via the transformer-based model for example, can generate a contextual embedding(s) (or set of contextual embeddings) that captures the spatial and temporal information within that specific segment. Engine 200 can then operate to calculate a similarity index between these video embeddings, which can be performed via a metric such as cosine similarity, for example. Such similarity index serves as a mechanism (e.g., as it is configured as a data structure or other type of file, object or item) of quantifying the contextual relationships between the different video segments, forming the foundation for the subsequent saliency detection process.

As mentioned above, as discussed herein, the underlying premise is that important or noteworthy events within the video, such as a goal in a sports match, can have a lower cross-similarity to the rest of the footage. Therefore, by analyzing the distribution of similarity scores, engine 200 can identify the video segments that stand out from the rest, marking them as potentially salient.

In some embodiments, information related to the video embeddings and/or similarity index can be stored in database 108, as discussed above.

In Step 308, engine 200 can perform an analysis of a set of segments associated with the video based on the embeddings and similarity index. That is, according to some embodiments, based on the video embeddings and similarity index in hand, engine 200 can analyze the set of video segments associated with the input video (e.g., as discussed above, the video includes a set of segments (e.g., set of frames) that constitute the video file). This analysis leverages the insights gained from the previous steps to identify the most salient and distinct video segments.

According to some embodiments, engine 200 can perform the analysis of Step 308 via any of the AI/ML and/or LLM techniques discussed above, whereby the video (e.g., set of segments), embeddings and similarity index can be provided as input for analysis via such model(s). Accordingly, engine 200 can employ a variety of techniques to determine the appropriate similarity threshold for identifying salient segments. In some embodiments, such functionality can involve determining and applying an adaptive threshold based on the distribution of similarity scores, and/or leveraging statistical methods to identify outliers in the similarity landscape. By computationally analyzing the similarity patterns across the video segments, engine 200 can detect the parts (e.g., subset of segments) of the video that are contextually related, but include content that is different or stands out from the rest, yet are sequentially related (e.g., unique segments that constitute a play from a game by a player(s), for example). Such segments are determined via such analysis by engine 200 to likely (at least have a score satisfying such threshold (s)) to contain the most important or noteworthy events, which will form the basis for the final video highlights, as discussed infra.

In some embodiments, engine 200 can function to incorporate additional information, such as but not limited to, event-specific metadata (e.g., score, time, player names) and/or user preferences, to refine the saliency detection process and ensure that the generated highlights are tailored to the specific needs of the target audience.

In Step 310, engine 200 can operate to identify a set of unique segments based on the analysis in Step 308. According to some embodiments, with the salient video segments identified, engine 200 can function to select a set of unique segments that will be used to generate the final video highlight. Such selection process can be utilized to create a coherent and compelling highlight reel that captures the most important events within the video, while avoiding redundancy or repetition.

According to some embodiments, engine 200 can employ various mechanisms to identify the set of unique segments, which can be performed separately or in combination with other mechanisms. For example, engine 200 can employ chronological ordering processing, in that the salient segments can be arranged in their original chronological order, preserving the natural flow and timeline of the video. In another example, engine 200 can employ event-based prioritization processing, such that, based on event classification operations, engine 200 can prioritize the inclusion of unique segments based on the type of event they represent (e.g., goals, touchdowns, fouls). In yet another example, engine 200 can perform diversity optimization processing, where engine 200 can maximize the diversity of the selected segments, ensuring that the highlight reel covers a broad range of events and perspectives. And, in another non-limiting example, engine 200 can perform relevance scoring, where each salient segment can be evaluated based on its relevance and/or importance (e.g., via the AI/ML and/or LLM techniques discussed supra), whereby the most relevant segments can be selected for inclusion in the highlight.

Thus, Step 310's identification of segments can involve the curation of content for the highlight which can ensure that the generated video highlight provides a comprehensive and engaging recap of the most significant events within the input video.

In Step 312, engine 200 can function to generate a video highlight (e.g., video file) based on the set of unique segments. Such creation of the video file (e.g., highlight) can involve computerized operations for creating a new video file, which can include, but is not limited to, clip stitching and sequencing, additional or transitions and/or visual effects, metadata incorporation, modification and/or personalization, output optimization, and the like, or some combination thereof. Such video creation can account for, for example, file format, resolution, bitrate, and the like, which can ensure the highlight can be rendered and/or integrated into the target distribution channel for end-users.

For example, such highlight can be tailored to a specific view or use case. Thus, for example, engine 200 can modify the generated highlight to emphasize or showcase certain content that is relevant to specific viewers. Such modification can be based on a criteria, which can include, but is not limited to, a user, time, date, location, content type, content ID, resolution, bitrate, device or interface type for display/rendering of the highlight, and the like. For example, if the highlight is intended for a particular viewer (e.g., a child's father), engine 200 can adjust the framing or focus of the video to ensure that the viewer's child is prominently featured in the highlight.

In yet another example, in some embodiments, engine 200 modify and/or incorporate information into the highlight, which can be related to, but is not limited to, specific players, teams, plays, statistics, graphics, annotations, and the like, or some combination thereof.

And, in Step 314, engine 200 can provide the generated highlight for rendering and/or display. That is, in some embodiments, the highlight can be provided to users by, but not limited to, sending as a message, displaying on a user interface (UI), posting on a page, downloading to a device or account, playing on a device, and the like, or some combination thereof.

Accordingly, as discussed supra, the operations of Process 300 performed by engine 200 provide innovative mechanisms for automated video highlight generation, which leverages the power of computer models (e.g., LLMs and/or transformers) to revolutionize the way video content is consumed and shared. By harnessing the rich contextual information encoded in video embeddings, the framework can accurately detect and classify salient events within video footage, enabling the automatic creation of labeled video highlights without the need for manual intervention, as discussed above.

Figure 4:
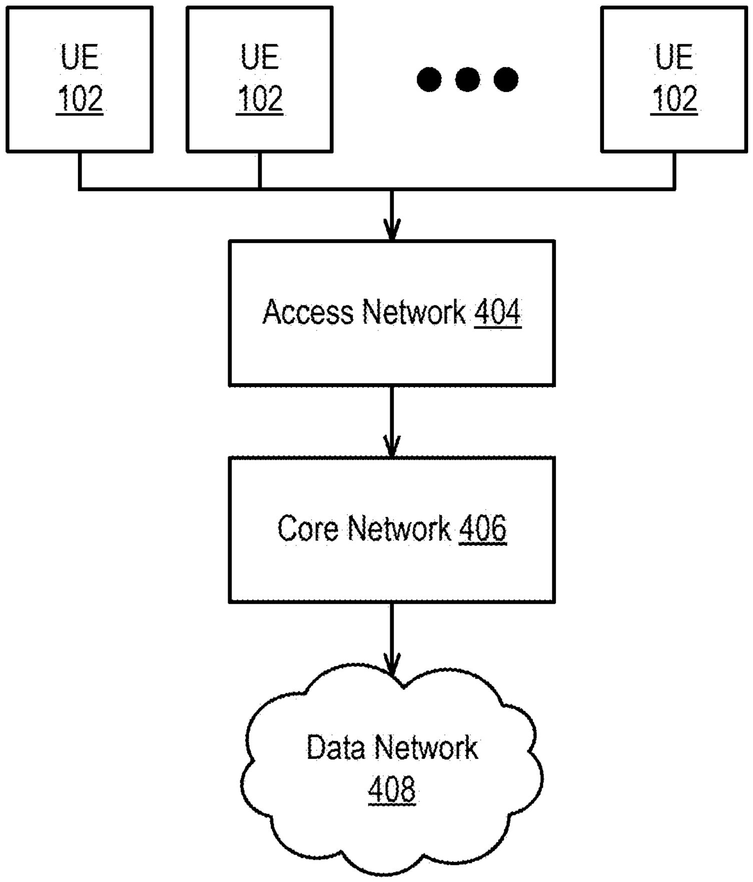
FIG. 4 illustrates a non-limiting example embodiment of a network architecture according to some embodiments of the present disclosure.

FIG. 4 is a block diagram of an example network architecture according to some embodiments of the present disclosure. In the illustrated embodiment, UE 102 accesses a data network 408 via an access network 404 and a core network 406.

In the illustrated embodiment, the access network 404 comprises a network allowing network communication with UE 102. In general, the access network 404 includes at least one base station that is communicatively coupled to the core network 406 and coupled to zero or more UE 102.

In some embodiments, the access network 404 comprises a cellular access network, for example, a 4G network. In an embodiment, the access network 404 can include a NextGen Radio Access Network (NG-RAN). In an embodiment, the access network 404 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 404 provides access to a core network 406 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 406 and to external network-attached elements in a data network 408 such as the Internet.

In the illustrated embodiment, the access network 404 and the core network 406 are operated by a NO. However, in some embodiments, the networks (404, 406) may be operated by a private entity and may be closed to public traffic. For example, the components of the network 406 may be provided as a single device, and the access network 404 may comprise a small form-factor base station. In these embodiments, the operator of the device can simulate a cellular network, and UE 102 can connect to this network similar to connecting to a national or regional network.

In some embodiments, the access network 404, core network 406 and data network 408 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 5:
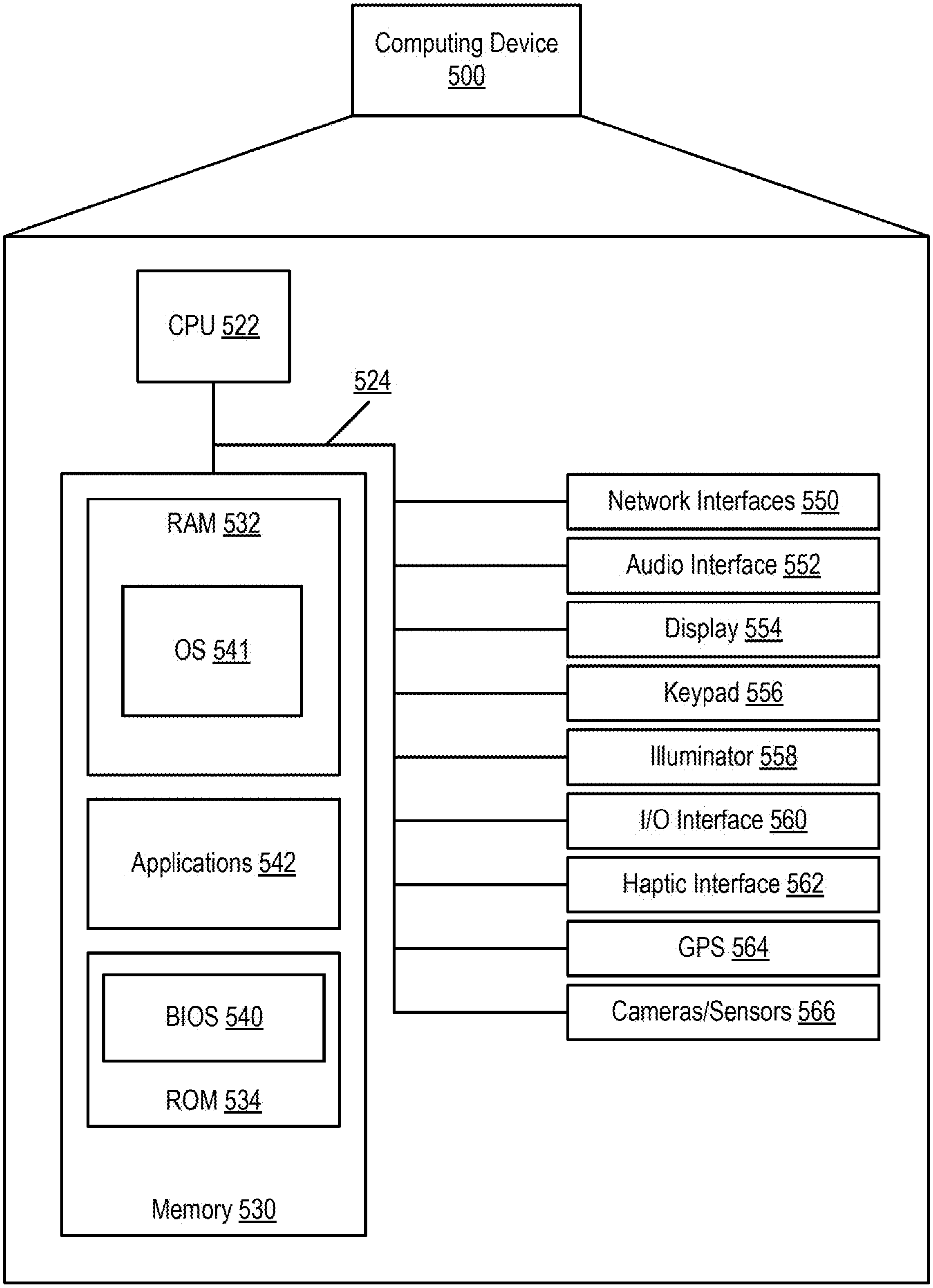
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a CPU 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to ROM 534.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special-purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

identifying, by a device, a video comprising a set of video segments, each video segment comprising content;

determining, by the device, for each of the video segments, a video embedding and a similarity index;

analyzing, by the device, the video embeddings and the similarity index for each of the set of video segments;

determining, by the device, based on the analysis, a subset of the video segments, the subset of the video segments comprising a plurality of unique video segments identified based on a similarity index distribution and an adaptive threshold; and generating, by the device, a highlight file comprising a configuration of the subset of the video segments.

2. The method of claim 1, further comprising communicating the highlight file for display on a user interface (UI).

3. The method of claim 1, further comprising modifying the highlight file based on a criteria, the modification causing modification of content within the configuration of the subset of video segments.

4. The method of claim 1, wherein the determining of the similarity index is based on the determined video embedding.

5. The method of claim 1, wherein the video embeddings are based on a temporal embedding or a spatial embedding.

6. The method of claim 1, further comprising:

determining, based on an analysis of the video, a set of video embeddings, wherein the set of video embeddings include a temporal embedding and a spatial embedding; and performing the analysis of the set of video segments further based on the set of video embeddings.

7. The method of claim 6, wherein the analysis of the video is performed via a transformer-based model.

8. The method of claim 1, wherein the analysis of the set of video segments is performed via a large language model (LLM).

9. The method of claim 1, further comprising, that the subset of video segments within the set of video segments are contextually relevant and comprise content that is sequentially related according to a time sequence.

10. The method of claim 1, wherein the video being selected is either: a live-stream video or a pre-recorded video.

11. A device comprising:

a processor configured to:

identify a video comprising a set of video segments, each video segment comprising content;

determine, for each of the video segments, a video embedding and a similarity index;

analyze the video embeddings and the similarity index for each of the set of video segments;

determine, based on the analysis, a subset of the video segments, the subset of the video segments comprising a plurality of unique video segments identified based on a similarity index distribution and an adaptive threshold; and generate a highlight file, the highlight file comprising a configuration of the subset of the video segments.

12. The device of claim 11, wherein the processor is further configured to communicate the highlight file for display on a user interface (UI).

13. The device of claim 11, wherein the processor is further configured to modify the highlight file based on a criteria, the modification causing modification of content within the configuration of the subset of video segments.

14. The device of claim 11, wherein the determining of the similarity index is based on the determined video embedding.

15. The device of claim 11, wherein the processor is further configured to:

determine, based on an analysis of the video, a set of video embeddings-embedding including a temporal embedding and a spatial embedding; and perform the analysis of the set of video segments further based further on the set of video embeddings.

16. A non-transitory computer-readable storage medium tangibly encoded with computer-executable instructions, that when executed by a device, perform a method comprising:

identifying, by the device, a video comprising a set of video segments, each video segment comprising content;

determining, by the device, for each of the video segments, a video embedding and a similarity index;

analyzing, by the device, the video embeddings and the similarity index for each of the set of video segments;

determining, by the device, based on the analysis, a subset of the video segments, the subset of the video segments comprising a plurality of unique video segments identified based on a similarity index distribution and an adaptive threshold; and generating, by the device, a highlight file comprising a configuration of the subset of the video segments.

17. The non-transitory computer-readable storage medium of claim 16, further comprising communicating the highlight file for display on a user interface (UI).

18. The non-transitory computer-readable storage medium of claim 16, further comprising modifying the highlight file based on a criteria, the modification causing modification of content within the configuration of the subset of video segments.

19. The non-transitory computer-readable storage medium of claim 16, wherein the determining of the similarity index is based on the determined video embedding.

20. The non-transitory computer-readable storage medium of claim 16, further comprising:

determining, based on an analysis of the video, a set of video embeddings including a temporal embedding and a spatial embedding; and performing the analysis of the set of video segments further based on the set of video embeddings.

* * * * *